US009686802B2

(12) United States Patent
Worrall et al.

(10) Patent No.: US 9,686,802 B2
(45) Date of Patent: Jun. 20, 2017

(54) USER EQUIPMENT CHARACTERISTICS

(71) Applicant: Alcatel Lucent, Boulogne Billancourt (FR)

(72) Inventors: Chandrika K. Worrall, Swindon (GB); Sudeep K. Palat, Swindon (GB)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/420,055

(22) PCT Filed: Jul. 31, 2013

(86) PCT No.: PCT/EP2013/002265
§ 371 (c)(1),
(2) Date: Feb. 6, 2015

(87) PCT Pub. No.: WO2014/023400
PCT Pub. Date: Feb. 13, 2014

(65) Prior Publication Data
US 2015/0195716 A1    Jul. 9, 2015

(30) Foreign Application Priority Data
Aug. 6, 2012 (EP) .................................... 12360061

(51) Int. Cl.
*H04W 72/08* (2009.01)
*H04W 76/06* (2009.01)
(Continued)

(52) U.S. Cl.
CPC ......... *H04W 72/085* (2013.01); *H04W 4/028* (2013.01); *H04W 24/02* (2013.01);
(Continued)

(58) Field of Classification Search
CPC ... H04W 24/02; H04W 72/08; H04W 76/068; H04W 24/10; H04W 72/048
See application file for complete search history.

(56) References Cited

U.S. PATENT DOCUMENTS

2008/0043672 A1* 2/2008 Sebire ............... H04W 36/0055
370/331
2008/0194252 A1 8/2008 Narasimha
(Continued)

FOREIGN PATENT DOCUMENTS

EP 1124400 A2 1/2001
EP 2637447 A1 9/2013
(Continued)

OTHER PUBLICATIONS

English Bibliography for Japanese Patent Application Publication No. JP2013502748A, published Jan. 24, 2013, printed from Thomson Innovation on Feb. 26, 2016, 4 pp.
(Continued)

*Primary Examiner* — Nathan Mitchell
(74) *Attorney, Agent, or Firm* — Fay Sharpe, LLP

(57) ABSTRACT

A method of providing an indication of ambient operational characteristics of user equipment to a network control node in a wireless communication network is disclosed. A method of configuring radio resource allocation to user equipment in a wireless communication network in response to an indication of ambient operational characteristics of said user equipment is also disclosed. The method of providing an indication of ambient operational characteristics of user equipment to a network control node in a wireless communication network includes determining how many cell boundaries the user equipment has crossed within a monitoring period; assessing an operational parameter indicative of a relationship between the user equipment and each cell visited during the monitoring period; and communicating an
(Continued)

Traditional UMTS Architecture indication of how many cell boundaries have been crossed together with an indication of the operational parameter to the network control node.

24 Claims, 1 Drawing Sheet

(51) Int. Cl.
| | | |
|---|---|---|
| *H04W 24/02* | (2009.01) | |
| *H04W 4/02* | (2009.01) | |
| *H04W 24/08* | (2009.01) | |
| *H04W 76/04* | (2009.01) | |
| *H04W 24/10* | (2009.01) | |
| *H04W 72/04* | (2009.01) | |

(52) U.S. Cl.
CPC ........... *H04W 24/08* (2013.01); *H04W 72/08* (2013.01); *H04W 76/046* (2013.01); *H04W 76/068* (2013.01); *H04W 24/10* (2013.01); *H04W 72/048* (2013.01)

(56) References Cited

U.S. PATENT DOCUMENTS

| | | | |
|---|---|---|---|
| 2010/0142486 A1* | 6/2010 | Wahlqvist | H04W 36/0005 370/332 |
| 2010/0173626 A1* | 7/2010 | Catovic | H04W 76/027 455/423 |
| 2010/0272050 A1* | 10/2010 | Lim | H04W 8/22 370/329 |
| 2010/0317349 A1 | 12/2010 | Serravalle | |
| 2012/0129509 A1 | 5/2012 | Chan et al. | |
| 2012/0142355 A1 | 6/2012 | Jha | |
| 2013/0225171 A1* | 8/2013 | Singh | H04W 36/245 455/436 |
| 2013/0225178 A1 | 8/2013 | Kojima | |
| 2014/0200005 A1* | 7/2014 | Wegmann | H04W 36/165 455/436 |
| 2014/0274049 A1* | 9/2014 | Singh | H04W 36/0083 455/436 |
| 2015/0111581 A1* | 4/2015 | Yiu | H04W 4/22 455/437 |
| 2015/0119044 A1* | 4/2015 | Hwang | H04W 8/08 455/437 |
| 2015/0215830 A1* | 7/2015 | Dalsgaard | H04W 36/0094 455/444 |
| 2015/0382266 A1* | 12/2015 | Lim | H04W 8/22 455/436 |

FOREIGN PATENT DOCUMENTS

| | | |
|---|---|---|
| GB | 2 472 791 A | 2/2011 |
| JP | 2013-502748 A | 1/2013 |
| WO | 2012059954 A1 | 5/2012 |

OTHER PUBLICATIONS

3GPP TS 36.304 V11.0.0 (Release 11); 3rd Generation Partnership Project; Technical Specification Group Radio Access Network; Evolved Universal Terrestrial Radio Access (E-UTRA); User Equipment (UE) procedures in idle mode; Jun. 2012, 33 pp.

3GPP TS 36.331 V10.6.0 (Release 10); 3rd Generation Partnership Project; Technical Specification Group Radio Access Network; Evolved Universal Terrestrial Radio Access (E-UTRA); Radio Resource Control (RRC); Protocol specification; Jun. 2012, 302 pp.

PCT Pat App No. PCT/EP2013/002265, Written Opinion of the International Searching Authority, mailed Oct. 16, 2013, 14 pp.

European Pat. App. No. 12360061.1, Extended European Search Report, mailed Oct. 16, 2012, 14 pp.

English Bibliography for PCT Patent Application Publication No. WO2012059954A, published May 10, 2012, printed from Thomson Innovation on Mar. 18, 2016, 3 pp.

International Search Report for PCT/EP2013/002265 dated Oct. 16, 2013.

European Pat. App. No. 14189225.7, Extended European Search Report, mailed Mar. 23, 2015, 15 pp.

European Pat. App. No. 14198792.5, Extended European Search Report, mailed Mar. 24, 2015, 20 pp.

* cited by examiner

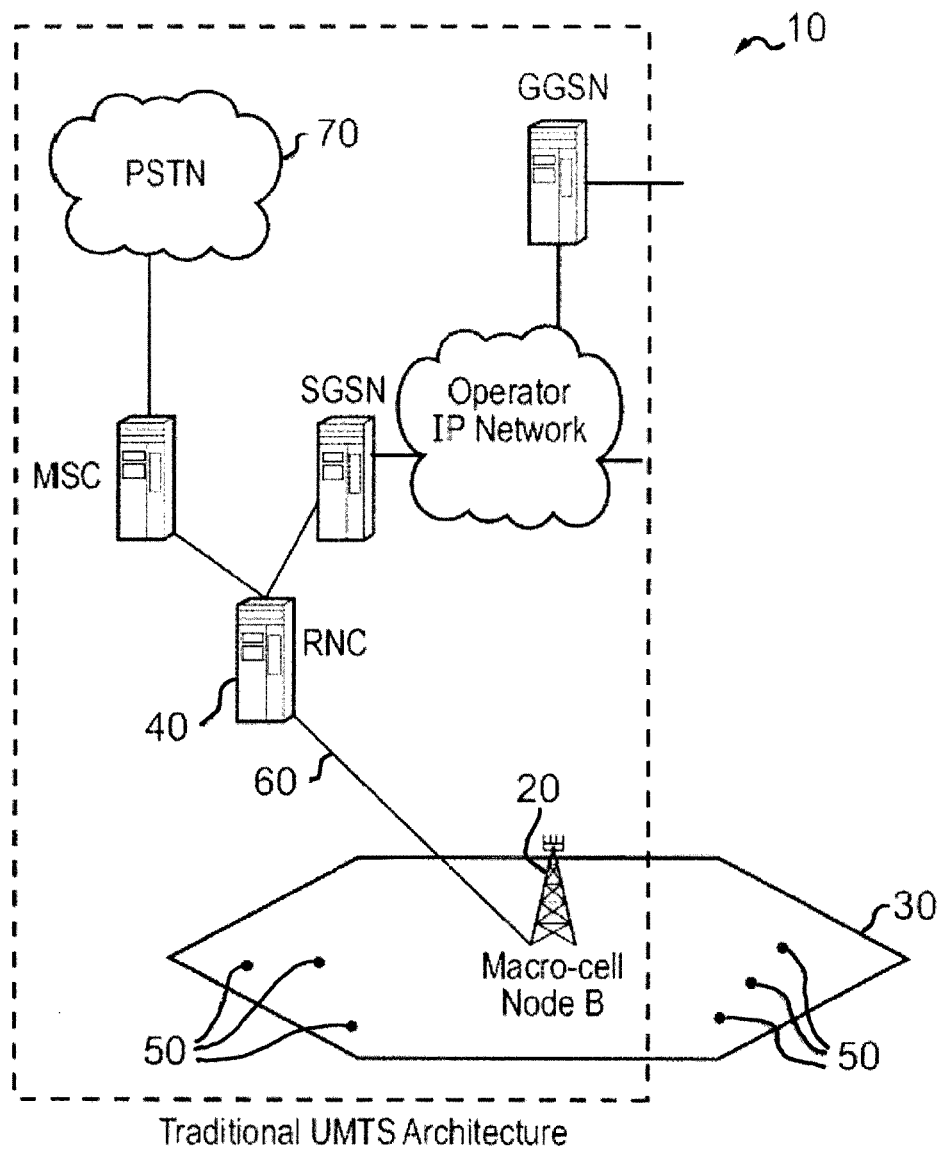

USER EQUIPMENT CHARACTERISTICS

FIELD OF THE INVENTION

The present invention relates to a method of providing an indication of ambient operational characteristics of user equipment to a network control node in a wireless communication network, a computer program product and user equipment operable to perform that method and a method of configuring radio resource allocation to user equipment in a wireless communication network in response to an indication of ambient operational characteristics of the user equipment, a computer program product and network control node operable to perform that method.

BACKGROUND

Wireless telecommunications systems are known. In those known systems, radio coverage is provided to user equipment, for example, mobile telephones, by geographical area. A base station is located in each geographical area to provide the required radio coverage. User equipment in the area served by a base station receives information and data from the base station and transmits information and data to the base station. In a high-speed packet access (HSPA) telecommunications network, data and information is sent between user equipment and a base station in data packets on a radio frequency carrier.

A network may have limited resource available for allocation to user equipment. It is desired to allocate limited system resource within a network efficiently.

SUMMARY

Accordingly, a first aspect provides a method of providing an indication of ambient operational characteristics of user equipment to a network control node in a wireless communication network, the method comprising: determining how many cell boundaries the user equipment has crossed within a monitoring period; assessing an operational parameter indicative of a relationship between the user equipment and each cell visited during the monitoring period; and communicating an indication of how many cell boundaries have been crossed together with an indication of the operational parameter to the network control node.

The first aspect recognizes that user equipment within a network may be operable to provide network control nodes with information which may assist with network resource allocation. Information provided to network control nodes may be used to achieve user equipment power savings, for example, for user equipment running smart phone applications. Performing a method according to the first aspect may allow user equipment to provide information to assist the network and recognizes that there are various ways in which user equipment may operate to derive meaningful information which can be provided to a network to assist with network resource configuration.

Parameters which may be useful to a network when performing radio resource configuration include: user equipment traffic profile, user equipment traffic characteristics, user equipment inactivity period, and user equipment mobility profile. By providing indications of such recent or ambient user equipment characteristics a network can be operable to take likely user equipment operation into account when allocating resource.

A user equipment mobility profile can be derived based on indications of user equipment speed typically calculated by scaling information relating to user equipment cell (re) selection. A mobility profile or estimate can be defined based upon a number of cell crossings by user equipment in a given period of time, for example, a configurable monitoring period. It will be appreciated that such an estimate may not provide a sufficiently accurate indication of user equipment speed to be useful for radio configuration by a network. However, the first aspect recognizes that by supplementing that cell crossing information with further information relating to a relationship between user equipment and the cells through which it is passing can allow a network control node, for example, a scheduler provided at a base station or radio resource management entity, to make more valid calculations or assumptions about general operation of user equipment.

Aspects and embodiments described aim to improve accuracy of a speed estimate provided by user equipment to a network, may provide a network with an implicit indication of a traffic profile associated with user equipment and/or may provide a network with an implicit indication of a radio configuration used by user equipment for a previous radio connection.

In some embodiments, rather than determining how many cell boundaries have been crossed during a monitoring period and assessing an operational parameter indicative of a relationship between the user equipment and each cell visited during the monitoring period; the method may comprise assessing operational parameters indicative of a relationship between the user equipment and each cell visited for the last N recorded cell entries for user equipment or the last N cells, where N is a configurable parameter. Accordingly, there may be no need for a configurable monitoring period.

In one embodiment, the operational parameter indicative of a relationship between the user equipment and each cell visited during the monitoring period comprises a cell ID of each cell visited. Accordingly, a cell ID may be linked with a particular call size and may be looked up by the network. By providing an indication of a likely size of cell through which user equipment has passed it is possible for user equipment speed to be more accurately estimated.

In one embodiment, the operational parameter indicative of a relationship between the user equipment and each cell visited during the monitoring period comprises an indication of a cell size of each cell visited. Accordingly, rather than just indicate a cedd ID, a cell may be operable to broadcase a cell size. The "cell type" parameter may be defined as small, large, medium, based on the cell size In one embodiment, the operational parameter indicative of a relationship between the user equipment and each cell visited during the monitoring period comprises an indication of how long the user equipment was in each cell visited during the monitoring period. In some embodiments, the "cell type" parameter may be signaled to user equipment by a base station supporting a cell. In some embodiments, a cell ID provided by user equipment may be used by a network to associate a cell type with listed cell IDs. It will be appreciated that, in some embodiments, a base station may be operable to broadcast an indication of cell size so that idle mode and connected mode user equipment are aware of a cell size being supported by a base station, for example NodeB or eNodeB.

Since mobility state estimates are typically calculated by counting the number of cell crossings, if user equipment is crossing small cells over a given time period it is likely that the number of cells crossed will result in a mobility state estimate indicator being returned as "high". If user equipment is moving with the same speed across large cells, it is likely that the mobility state estimate indicator reported to the network would be "low". It may be possible to improve user equipment speed estimation accuracy, by taking into account the cell type of cells crossed by user equipment. In some embodiments, for example, user equipment may be operable to indicate a cell type associated with the majority of cells crossed by user equipment in the given mobility state estimate time period. In some embodiments, user equipment may be operable to report a cell type associated with of the majority of the cells used to make a mobility estimate calculation at a network control node.

In one embodiment, the operational parameter indicative of a relationship between the user equipment and each cell visited during the monitoring period comprises an indication of the user equipment radio connection status whilst in each cell visited during the monitoring period. Accordingly, if user equipment is idle for a large proportion of the monitoring period, or active for a large proportion of the monitoring period, resource allocation made by a network control node may take account of that likely behaviour of user equipment. User equipment may move into a given cell whilst in an RRC idle mode, and remain in RRC idle for "m" minutes prior to establishing an RRC connection. If period "m" is small, then the network may be configured to consider such user equipment to be fast moving. If "m" is large, the network may be configured to consider such user equipment to be slow moving. If, however, user equipment "powers on" within a given cell "m" minutes prior to establishing an RRC connection and the "m" value is small, that information should not be interpreted as meaning the user equipment is fast moving. Accordingly, in some embodiments, when user equipment powers on, whether or not the user equipment was powered on in a given cell, that power on should also be indicated to the network when providing user equipment information in order that the network can derive an appropriate radio configuration for the user equipment. Accordingly, according to some embodiments, user equipment may be operable to indicate user equipment RRC state (power off, RRC_idle, RRC_connected) whilst in each cell which may be listed as being crossed when reporting a list as part of mobility state estimate information. If user equipment has been in both RRC_idle and RRC connected states in a listed cell, in some embodiments, the user equipment may be operable to indicate to the network the time spent in each state.

In one embodiment, the indication of the operational parameter communicated to the network control node comprises an indication of an assessed operational parameter for each cell visited during the monitoring period. Accordingly, detailed information relating to each cell through which user equipment has passed may be shared with a network control node. It will be appreciated that some information obtained by reporting methods described herein may be available to a network control node via other means, but that those means, for example, packet or data tracing, may take more time than the reporting methods based on user equipment directly communicating with a network control node.

In one embodiment, the indication of the operational parameter communicated to the network control node comprises an indication of an overall assessed operational parameter for all cells visited during the monitoring period. Accordingly, user equipment may be operable to report a characteristic indicative of a majority of cells visited or passed through during said monitoring period. Thus an average or overview of user equipment operation may be provided to a network control node.

In one embodiment, the method further comprises: noting a characteristic of the last radio resource control (RRC) connection obtained by the user equipment and providing an indication of the characteristic to the network control node. Information provided by user equipment can be used by a network when configuring a dormancy timer value for user equipment. Typically a dormancy timer is set to run on the network side for each RRC connected user equipment. If user plane data communication is absent for a given "dormancy timer" value, in other words, if user equipment is inactive for a time period defined by the dormancy timer, the network releases the RRC connection of that user equipment. Thereafter, the user equipment is operable to move to a so-called RRC_Idle state. The network is typically operable to calculate a dormancy timer for user equipment based on user equipment traffic traces at the network. It will be appreciated that such a calculation may take some time on the network side. According to some embodiments, user equipment may be operable to compute inactive time periods of operation experienced during an immediately previous RRC connected period and provide an indication of inactive time periods experienced to the network on obtaining an RRC connection. Inactivity time from a user equipment perspective is typically defined as a duration of a time period calculated between reception or transmission of a last packet of user data and RRC connection release. Thus according to some embodiments, an inactivity timer value determined by user equipment may be communicated to the network.

In one embodiment, the characteristic comprises a dormancy timer associated with the last radio resource control connection.

In one embodiment, the characteristic comprises an indication of an elapsed time period between last user plane data and a request from the user equipment for a new radio resource control connection. In one embodiment, user equipment may be operable to indicate a "time since last connection release" to the network. In some embodiments, that indication may be sent together with an indication of user equipment inactivity time during the last RRC connection. That information may be combined to give total user equipment inactivity time. The total user equipment inactivity time may be used by a network to determine an appropriate radio configuration for user equipment.

According to some embodiments, an inactivity timer indicator sent to the network may be "high", "medium" or "low". The indicator sent is based on configured or predefined thresholds. Sending a high/medium/low indicator may reduce the amount of information transmitted between user equipment and the network, thereby providing an efficient means of communicating useful control information between network nodes.

According to some embodiments, the method comprises identifying, from information provided by user equipment, whether user equipment is moving between two cells. Accordingly, it may be possible to identify whether user equipment is operating at a cell border. It will be appreciated that the user equipment may be operable to itself identify that it is moving between two cells and indicate that to a network control node, or it may be operable to provide information to the network control node so that the control node can identify that user equipment is operating at a cell border. In another embodiment, a cell crossing between two cells in a border case may be formulated such that the cell crossing appears to have happened for the last m seconds and that information may be signaled to the network.

A second aspect provides a computer program product operable, when executed on a computer, to perform the method of the first aspect.

A third aspect provides user equipment operable to provide an indication of its ambient operational characteristics to a network control node in a wireless communication network, the user equipment comprising: determination logic operable to determine how many cell boundaries the user equipment has crossed within a monitoring period; assessment logic operable to assess an operational parameter indicative of a relationship between the user equipment and each cell visited during the monitoring period; and communication logic operable to communicate an indication of how many cell boundaries have been crossed together with an indication of the operational parameter to the network control node.

In one embodiment, the operational parameter indicative of a relationship between the user equipment and each cell visited during the monitoring period comprises a cell ID of each cell visited.

In one embodiment, the operational parameter indicative of a relationship between the user equipment and each cell visited during the monitoring period comprises an indication of a cell size of each cell visited.

In one embodiment, the operational parameter indicative of a relationship between the user equipment and each cell visited during the monitoring period comprises an indication of how long the user equipment was in each cell visited during the monitoring period.

In one embodiment, the operational parameter indicative of a relationship between the user equipment and each cell visited during the monitoring period comprises an indication of the user equipment radio connection status whilst in each cell visited during the monitoring period.

In one embodiment, the indication of the operational parameter communicated to the network control node comprises an indication of an assessed operational parameter for each cell visited during the monitoring period.

In one embodiment, the indication of the operational parameter communicated to the network control node comprises an indication of an overall assessed operational parameter for all cells visited during the monitoring period.

In one embodiment, the user equipment further comprises: connection evaluation logic operable to note a characteristic of the last radio resource control (RRC) connection obtained by the user equipment and provide an indication of the characteristic to the network control node.

In one embodiment, the characteristic comprises a dormancy timer associated with the last radio resource control connection.

In one embodiment, the characteristic comprises an indication of an elapsed time period between last user plane data and a request from the user equipment for a new radio resource control connection.

A fourth aspect provides a method of configuring radio resource allocation to user equipment in a wireless communication network in response to an indication of ambient operational characteristics of the user equipment, the method comprising: receiving an indication of how many cell boundaries have been crossed by the user equipment in a monitoring period, together with an indication of an operational parameter indicative of a relationship between the user equipment and each cell visited by the user equipment during the monitoring period; and configuring an inactivity timer to apply to the user equipment in response to the received indications.

The fourth aspect recognises that radio resource may be configured by a network control node in accordance with information provided by user equipment. In particular, it recognises that information provided by user equipment regarding ambient operational parameters of that user equipment may be used to determine how to set an appropriate inactivity or "dormancy" timer for the user equipment. A network control node may also be operable to interpret information provided by user equipment regarding ambient operational parameters of that user equipment to generate an indication of a speed at which that user equipment is moving and/or a mobility profile for that user equipment. Furthermore, it will be appreciated that as an alternative, or in addition, to configuring an inactivity timer, it may be possible for the method to comprise configuring a discontinuous reception configuration to apply to user equipment in response to the received indications.

In one embodiment, the operational parameter indicative of a relationship between the user equipment and each cell visited during the monitoring period comprises a cell ID of each cell visited.

In one embodiment, the operational parameter indicative of a relationship between the user equipment and each cell visited during the monitoring period comprises an indication of a cell size of each cell visited.

In one embodiment, the operational parameter indicative of a relationship between the user equipment and each cell visited during the monitoring period comprises an indication of how long the user equipment was in each cell visited during the monitoring period.

In one embodiment, the operational parameter indicative of a relationship between the user equipment and each cell visited during the monitoring period comprises an indication of the user equipment radio connection status whilst in each cell visited during the monitoring period.

In one embodiment, the indication of the operational parameter communicated to the network control node comprises an indication of an assessed operational parameter for each cell visited during the monitoring period.

In one embodiment, the indication of the operational parameter communicated to the network control node comprises an indication of an overall assessed operational parameter for all cells visited during the monitoring period.

In one embodiment, the method further comprises: noting a characteristic of the last radio resource control (RRC) connection obtained by the user equipment and providing an indication of the characteristic to the network control node.

In one embodiment, the characteristic comprises a dormancy timer associated with the last radio resource control connection.

In one embodiment, the characteristic comprises an indication of an elapsed time period between last user plane data and a request from the user equipment for a new radio resource control connection.

A fifth aspect provides a computer program product operable, when executed on a computer, to perform the method of the fourth aspect.

A sixth aspect provides a network control node operable to configure radio resource allocation to user equipment in a wireless communication network in response to an indication of ambient operational characteristics of the user equipment, the network control node comprising: reception logic operable to receive an indication of how many cell boundaries have been crossed by the user equipment in a monitoring period, together with an indication of an operational parameter indicative of a relationship between the user equipment and each cell visited by the user equipment during the monitoring period; and configuration logic operable to configure an inactivity timer to apply to the user equipment in response to the received indications.

In one embodiment, the operational parameter indicative of a relationship between the user equipment and each cell visited during the monitoring period comprises a cell ID of each cell visited.

In one embodiment, the operational parameter indicative of a relationship between the user equipment and each cell visited during the monitoring period comprises an indication of a cell size of each cell visited.

In one embodiment, the operational parameter indicative of a relationship between the user equipment and each cell visited during the monitoring period comprises an indication of how long the user equipment was in each cell visited during the monitoring period.

In one embodiment, the operational parameter indicative of a relationship between the user equipment and each cell visited during the monitoring period comprises an indication of the user equipment radio connection status whilst in each cell visited during the monitoring period.

In one embodiment, the indication of the operational parameter communicated to the network control node comprises an indication of an assessed operational parameter for each cell visited during the monitoring period.

In one embodiment, the indication of the operational parameter communicated to the network control node comprises an indication of an overall assessed operational parameter for all cells visited during the monitoring period.

In one embodiment, the network control node further comprises: reception logic operable to receive an indication of a characteristic of the last radio resource control (RRC) connection obtained by the user equipment.

In one embodiment, the characteristic comprises a dormancy timer associated with the last radio resource control connection.

In one embodiment, the characteristic comprises an indication of an elapsed time period between last user plane data and a request from the user equipment for a new radio resource control connection.

A seventh aspect provides a method of providing an indication of ambient operational characteristics of user equipment to a network control node in a wireless communication network, the method comprising: determining a characteristic of the last radio resource control (RRC) connection obtained by the user equipment and providing an indication of the characteristic to the network control node.

In one embodiment, the characteristic comprises a dormancy timer associated with the last radio resource control connection.

In one embodiment, the characteristic comprises an indication of an elapsed time period between last user plane data and a request from the user equipment for a new radio resource control connection.

An eighth aspect provides a computer program product operable, when executed on a computer, to perform the method of the seventh aspect.

A ninth aspect provides user equipment operable to provide an indication of its ambient operational characteristics to a network control node in a wireless communication network, the user equipment comprising: determination logic operable to determine a characteristic of the last radio resource control (RRC) connection obtained by the user equipment and communication logic operable to provide an indication of the characteristic to the network control node.

In one embodiment, the characteristic comprises a dormancy timer associated with the last radio resource control connection.

In one embodiment, the characteristic comprises an indication of an elapsed time period between last user plane data and a request from the user equipment for a new radio resource control connection.

A tenth aspect provides a method of configuring radio resource allocation to user equipment in a wireless communication network in response to an indication of ambient operational characteristics of the user equipment, the method comprising: receiving an indication of a characteristic of the last radio resource control (RRC) connection obtained by the user equipment; and configuring an inactivity timer to apply to the user equipment in response to the received indication.

In one embodiment, the characteristic comprises a dormancy timer associated with the last radio resource control connection.

In one embodiment, the characteristic comprises an indication of an elapsed time period between last user plane data and a request from the user equipment for a new radio resource control connection.

An eleventh aspect provides a computer program product operable, when executed on a computer, to perform the method of the tenth aspect.

A twelfth aspect provides a network control node operable to configure radio resource allocation to user equipment in a wireless communication network in response to an indication of ambient operational characteristics of the user equipment, the network control node comprising: reception logic operable to receive an indication of a characteristic of the last radio resource control (RRC) connection obtained by the user equipment; and configuration logic operable to configure an inactivity timer to apply to the user equipment in response to the received indication.

In one embodiment, the characteristic comprises a dormancy timer associated with the last radio resource control connection.

In one embodiment, the characteristic comprises an indication of an elapsed time period between last user plane data and a request from the user equipment for a new radio resource control connection.

Features and embodiments of each aspect described herein may be combined with features and embodiments of each other aspect described herein as appropriate.

Further particular and preferred aspects are set out in the accompanying independent and dependent claims. Features of the dependent claims may be combined with features of the independent claims as appropriate, and in combinations other than those explicitly set out in the claims.

Where an apparatus feature is described as being operable to provide a function, it will be appreciated that this includes an apparatus feature which provides that function or which is adapted or configured to provide that function.

BRIEF DESCRIPTION OF THE DRAWINGS

Embodiments of the present invention will now be described further, with reference to the accompanying drawings, in which:

FIG. 1 illustrates schematically main components of one radio access technology wireless communication system in which aspects and embodiments may be of use.

DESCRIPTION OF THE EMBODIMENTS

FIG. 1 illustrates a wireless telecommunications system 10 according to one radio access technology. It will be appreciated that aspects and embodiments described may be applicable to other radio access technologies, in particular, to LTE system architectures. User equipment 50 roam through the wireless telecommunications system. Base stations 20 are provided which support areas of radio coverage 30. A number of such base stations 20 are provided and are distributed geographically in order to provide a wide area of coverage to user equipment 50. When user equipment is within an area served by a base station 30, communications may be established between the user equipment and the base station over associated radio links. Each base station typically supports a number of sectors within the geographical area of service 30.

Typically a different antenna within a base station supports each associated sector. Accordingly, each base station 20 has multiple antennas and signals sent through the different antennas are electronically weighted to provide a sectorised approach. Of course, it will be appreciated that FIG. 1 illustrates a small subset of the total number of user equipment and base stations that may be present in a typical communications system.

The radio access network of the wireless communications system is managed by a radio network controller (RNC) 40. The radio network controller 40 controls operation of the wireless communications system by communicating with a plurality of base stations over a backhaul communications link 60. The network controller also communicates with user equipment 50 via each base station.

A radio network controller 60 maintains a neighbour list which includes information about geographical relationships between sectors supported by base stations 20. In addition, the radio network controller 60 maintains location information which provides information on the location of user equipment 50 within the wireless communication system 10. The radio network controller is operable to route traffic via circuit switched and packet switched networks. Hence, a mobile switching centre is provided with which the radio network controller may communicate. The mobile switching centre can communicate with a circuit switched network such as a public switched telephone network (PSTN) 70. Similarly, a network controller can communicate with service general package radio service support nodes (SGSNs) and a gateway general packet support node (GGSN). The GGSN can communicate with a packet switched core such as, for example, the Internet.

User equipment 50 typically transmits information and data to a base station 20 so that it can be re-routed within a wireless telecommunications network. User equipment may, for example, need to transmit data to the base station in order to relay text messages, voice information when a user is using the equipment to make a telephone call, or other data. The base station 20, in combination with parameters set by the radio network controller 40, allocates resources to user equipment in a manner that aims to optimise operation of the wireless telecommunications network 10.

User equipment within a network may be operable to provide network control nodes with information which may assist with network resource allocation. Information provided to network control nodes may be used to achieve user equipment power savings, for example, for user equipment running smart phone applications.

User equipment may be operable to provide information to assist the network when connecting to the network. There are various ways in which user equipment may operate to derive meaningful information which can be provided to a network to assist with network resource configuration.

Aspects described relate to methods of deriving useful information for user equipment to provide to a network.

Parameters which may be useful in radio resource configuration include: user equipment traffic profile, user equipment traffic characteristics, user equipment inactivity period, and user equipment mobility profile.

User equipment mobility profile can be derived based on a "Mobility State Estimate" (MSE). Mobility state estimates are indications of user equipment speed based on scaling of information relating to user equipment cell (re)selection. A mobility state estimate is defined based upon a number of cell crossings by user equipment in a given period of time. It will be appreciated that such an estimate may not provide a sufficiently accurate indication of user equipment speed to be useful for radio configuration by a network. In particular, cell type and cell information is not considered when calculating a mobility state estimate. For example, user equipment may be crossing a region containing a large number of small cells or a region of macro cells within a given time period. Although that user equipment may be travelling at a constant speed, the number of cell crossings is likely to differ significantly in each of those scenarios and thus simply using "number of cell crossings" as a mobility state estimate cannot provide an accurate speed of user equipment estimate.

Furthermore, if user equipment is moving between two cells (cell border case), such mobility behavior is not accurately reflected in a mobility state estimate based on a simple cell crossing parameter.

Radio configuration based on inaccurate speed information can result in inefficient resource usage, increase signaling overhead and unnecessary user equipment power consumption.

Overview

Before discussing the embodiments in any more detail, first an overview will be provided. User equipment "assistance information" is to be provided to a network and may be used for configuring radio parameters related to the user equipment to achieve, for example, a saving in user equipment battery power usage.

For example, if user equipment is moving fast and has only background data traffic to send to/receive from a network, the network may configure a short dormancy timer in relation to that user equipment. The short dormancy timer results in the release of an RRC connection in a short time frame. Such an implementation may save mobility related signaling and also user equipment power consumption. In this context, "background traffic" is characterized as a traffic profile in which (i) there are long periods of inactivity (several minutes) followed by relatively short bursts of activity (few seconds) and/or, for example, instant messaging in which the traffic profile has a moderate period of packet inter arrival time (few seconds) together with low data rates (30-100 Bytes/s).

User equipment itself may be operable to derive dormancy timer information based on an assessment of a duration after which an RRC connection is released after a "final" data packet. User equipment "assistance information" may convey information relating to such a "dormancy time" as used for a previous connection thus provides a network with an implicit indication of traffic profile. A network may be operable to use such information to implement an efficient radio configuration.

Aspects and embodiments aim to improve accuracy of a speed estimate provided by user equipment to a network, may provide a network with an implicit indication of a traffic profile associated with user equipment and/or may provide a network with an implicit indication of a radio configuration used for a previous radio connection.

According to some aspects and embodiments, a mobility state estimate (MSE) comprising additional information to improve the accuracy of the information provided to a network is described. A mobility state estimate may be enhanced to include, for example, cell type information, or a characteristic relating to the last RRC connection, in information which is provided to the network.

According to some embodiments, user equipment may be operable to provide an indication of visited cell parameters in relation to a set of "n" cells visited. Those cell parameters, may, for example, comprise: cell information, cell type, duration stayed in the cell or user equipment state (power off, RRC idle or RRC connected) whilst within each cell. In some embodiments, an indication of a characteristic of the last RRC connection may be provided to a network.

Mobility state estimate indicators may be sent to the network such that it indicates to the network a general indication of user equipment sped. A mobility state estimate may be sent as in indicator having the possible values: high, medium and low. If the number of cell crossings recorded by user equipment in a given period of time is larger than a pre-defined threshold, MSE takes the value "high". If the number of cell crossing is less than a pre-defined threshold, MSE takes the value "low". If the number of cell crossings recorded by the user equipment is in between the pre-defined high and low threshold values; MSE takes the value "medium".

If user equipment is moving between just two cells, for example, the user equipment may be located at a border between two cells, user equipment may be operable to disregard those cell crossings when counting cell crossings for the purposes of providing a mobility state estimate. That is to say, user equipment does not count consecutive reselections between two cells for the purposes of mobility state detection criteria, user equipment may identify such border cases if an originating cell is reselected just after one other cell selection.

Cell selection counting is used in a speed scaling procedure for cell re-selection. A simple cell counting procedure may not provide sufficient accuracy to be used for radio resource allocation in relation to smart phone operation. Information provided by user equipment to a network can be used by a network for radio configuration, techniques may be implemented which may allow for a reduction in signaling overhead and/or improved battery power consumption by user equipment. For example, if user equipment is fast moving and has background application(s) running, an efficient mode of operation releases RRC connection after completion of reception or transmission of a background data packet required for the background application(s). In order to operate in such a manner, the network may configure a short dormancy timer for user equipment meeting those criteria (fast moving, background application(s) running).

If, on the other hand, user equipment is slow moving and has background application(s) running, user equipment may be best configured to retain an RRC connection with a long discontinuous reception (DRx) configuration. Such operation may be implemented by a network by setting a long dormancy timer in relation to user equipment meeting those criteria (slow moving, background application(s) running).

If user equipment is moving between two cells (border case), a mobility state estimate indication calculated based on the current techniques and sent to a network is "low", which means the network may assume the user equipment is slow moving. If the user equipment is configured with a long DRX and has a long dormancy timer based on such a reported "low" mobility state estimate indicator, the user equipment is operable to handover back and forth between the two cells as it crosses their border. Such operation results in unnecessary handover signaling. However, if a network is aware that user equipment is actually crossing cells, the network may be operable to allow an RRC connection to be released.

Aspects and embodiments described relate to a mobility state estimate indicator in which cell information is reported to a network by user equipment. In some embodiments, user equipment may be operable to indicate cell information relating to "N" last visited cells. Such cell information may include, for example, cell type, cell ID, duration of user equipment stay in cell. Ordering of a visited cell list is indicative of a path user equipment has followed. It will be understood that the same cell may be listed a number of times corresponding to user equipment visits. The "cell type" parameter may be defined as small, large, medium, based on the cell size.

In some embodiments, the "cell type" parameter may be signaled to user equipment by a base station supporting a cell. In some embodiments, a cell ID provided by user equipment may be used by a network to associate a cell type with listed cell IDs.

Since mobility state estimates are typically calculated by counting the number of cell crossings, if user equipment is crossing small cells over a given time period it is likely that the number of cells crossed will result in a mobility state estimate indicator being returned as "high". If user equipment is moving with the same speed across large cells, it is likely that the mobility state estimate indicator reported to the network would be "low". It may be possible to improve user equipment speed estimation accuracy, by taking into account the cell type of cells crossed by user equipment. In some embodiments, for example, user equipment may be operable to indicate a cell type associated with the majority of cells crossed by user equipment in the given mobility state estimate time period. In some embodiments, user equipment may be operable to report a cell type associated with of the majority of the cells used to make a mobility state estimate calculation together with a calculated MSE indicator.

Mobility information provided by user equipment can be used by a network when configuring a dormancy timer value for user equipment. A dormancy timer is set to run on the network side for each RRC connected user equipment. If user plane data communication is absent for a given "dormancy timer" value, in other words, if user equipment is inactive for a time period defined by the dormancy timer, the network releases the RRC connection of that user equipment. Thereafter, the user equipment is operable to move to a so-called RRC_Idle state. The network is typically operable to calculate a dormancy timer for user equipment based on user equipment traffic traces at the network. It will be appreciated that such a calculation may take some time on the network side. According to some embodiments, user equipment may be operable to compute inactive time periods of operation experienced during an immediately previous RRC connected period and provide an indication of inactive time periods experienced to the network on obtaining an RRC connection. Inactivity time from a user equipment perspective is typically defined as a duration of a time period calculated between reception or transmission of a last packet of user data and RC connection release.

According to some embodiments, an inactivity timer value determined by user equipment may be communicated to the network together with a mobility state estimate indicator. According to some embodiments an inactivity timer indicator sent to the network may be "high", "medium" or "low". The indicator sent is based on configured or pre-defined thresholds. Sending a high/medium/low indicator may reduce the amount of information transmitted between user equipment and the network, thereby providing an efficient means of communicating useful control information between network nodes.

User equipment originating information regarding last visited cells, may be used by a network to estimate user equipment speed. User equipment may be in RRC idle, RRC connected or a power off state in a radio cell. User equipment may operate in various states as it roams through a network. For example, user equipment may go through a cycle of RRC connected, power off, RRC Idle and RRC connected states whilst moving around.

User equipment may move into a given cell whilst in an RRC idle mode, and remain in RRC idle for "m" minutes prior to establishing an RRC connection. If period "m" is small, then the network may be configured to consider such user equipment to be fast moving. If "m" is large, the network may be configured to consider such user equipment to be slow moving. If, however, user equipment "powers on" within a given cell "m" minutes prior to establishing an RRC connection and the "m" value is small, that information should not be interpreted as meaning the user equipment is fast moving. Accordingly, in some embodiments, when user equipment powers on, whether or not the user equipment was powered on in a given cell, that power on should also be indicated to the network when providing user equipment information in order that the network can derive an appropriate radio configuration for the user equipment. Accordingly, according to some embodiments, user equipment may be operable to indicate user equipment RRC state (power off, RRC_idle, RRC_connected) whilst in each cell which may be listed as being crossed when reporting a list as part of mobility state estimate information. If user equipment has been in both RRC_idle and RRC connected states in a listed cell, in some embodiments, the user equipment may be operable to indicate to the network the time spent in each state.

Slow moving user equipment at a cell border may move between two cells resulting in handover ping-pong. According to one embodiment, user equipment moving between just two cell may be operable to determine that fact and inform the network accordingly. In some embodiments, that informing step may occur when the user equipment transmits a calculated MSE indication.

In one embodiment, user equipment may be operable to indicate a "time since last connection release" to the network. In some embodiments, that indication may be sent together with an indication of user equipment inactivity time during the last RRC connection. That information may be combined to give total user equipment inactivity time. The total user equipment inactivity time may be used by a network to determine an appropriate radio configuration for user equipment.

Aspects and embodiments provide mobility information to a network in order to allow a network to configure radio parameters for user equipment such to achieve better battery consumption and reduced signaling load within a network. Techniques described may be useful to smart phones operating with background applications running.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The functions of the various elements shown in the Figures, including any functional blocks labelled as "processors" or "logic", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" or "logic" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the Figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The invention claimed is:

1. A method of providing an indication of ambient operational characteristics of a user equipment to a network control node in a wireless communication network, said method comprising:
   assessing in the user equipment in both RRC_connected and RRC_idle mode cell information for each cell of a last N cells visited by a user equipment, wherein the assessing is performed at the user equipment, wherein the cell information includes information for cells visited by the user equipment in both RRC connected and idle modes; and communicating from the user equipment to said network control node said cell information for said last N cells visited as said indication of ambient operational characteristics, wherein said cell information includes information for cells visited by said user equipment in RRC_connected and in RRC_idle mode.

2. The method according to claim 1, wherein said cell information comprises at least one of:
   a cell ID of each of said last N cells visited;
   an indication of a cell type of each of said last N cells visited;
   an indication of how long said user equipment was in each of said last N cells visited; and
   an indication of said user equipment radio connection status whilst in each of said last N cells visited.

3. The method according to claim 2, wherein said cell information comprises an indication of said cell type of each of said last N cells visited and said indication of cell type comprises an indication of cell size.

4. The method according to claim 3, wherein said indication of cell size comprises one of small, medium and large.

5. The method according to claim 1, wherein N is a configurable parameter.

6. The method according to claim 1, wherein said cell information for said last N cells visited includes an order of said cells visited.

7. The method according to claim 1, wherein said method further comprises:
   noting a characteristic of the last radio resource control (RRC) connection obtained by said user equipment and
   providing an indication of said characteristic from said user equipment to said network control node.

8. The method according to claim 1, wherein said cell information comprises an overall assessed operational parameter indicative of a relationship between said user equipment and all of said last N cells visited.

9. User equipment operable to provide an indication of its ambient operational characteristics to a network control node in a wireless communication network, said user equipment comprising:
   assessment logic operable in both RRC connected and RRC idle mode to assess cell information for each cell of a last N cells visited; and
   communication logic operable to communicate to said network control node said cell information for said last N cells visited as said indication of ambient operational characteristics, wherein said cell information includes information for cells visited by said user equipment in RRC_connected and in RRC_idle mode.

10. A method of configuring radio resource allocation to user equipment in a wireless communication network in response to an indication of ambient operational characteristics of said user equipment, said method comprising:
    receiving at a network node cell information for each cell of a last N cells visited by said user equipment in both RRC_connected and RRC_idle mode as said indication of ambient operational characteristics; and
    at least one of:
      configuring at said network node an inactivity timer to apply to said user equipment in response to said received indication of ambient operational characteristics for said last N cells visited; and
      configuring at said network node a discontinuous reception configuration to apply to said user equipment in response to said received indication of ambient operational characteristics for said last N cells visited.

11. The method according to claim 10, comprising:
    interpreting at said network node said ambient operational characteristics of said user equipment to generate an indication of a speed at which said user equipment is moving.

12. The method according to claim 10, comprising:
    interpreting at said network node said ambient operational characteristics of said user equipment to generate a mobility profile for said user equipment.

13. A non-transitory computer-readable medium storing program instructions that, when executed on a computer, cause a computer-controlled network node to perform a method according to claim 10.

14. A network control node operable to configure radio resource allocation to user equipment in a wireless communication network in response to an indication of ambient operational characteristics of said user equipment, said network control node comprising:
    reception logic operable to receive cell information for each cell of a last N cells visited by said user equipment in RRC_connected and RRC_idle mode as said indication of ambient operational characteristics; and
    configuration logic operable to configure at least one of:
      an inactivity timer to apply to said user equipment in response to said received indication of ambient operational characteristics for said last N cells visited; and
      a discontinuous reception configuration to apply to said user equipment in response to said received indication of ambient operational characteristics for said last N cells visited.

15. The network control node according to claim 14, further comprising:
    interpreting logic operable to interpret said ambient operational characteristics of said user equipment to generate an indication of a speed at which said user equipment is moving.

16. The user equipment according to claim 9, wherein the cell information comprises at least one of:
    a cell ID of each of the last N cells visited;
    an indication of a cell type of each of the last N cells visited;
    an indication of how long the user equipment was in each of the last N cells visited; and
    an indication of the user equipment radio connection status whilst in each of the last N cells visited.

17. The user equipment according to claim 16, wherein the cell information comprises an indication of the cell type of each of the last N cells visited and the indication of cell type comprises an indication of cell size.

18. The user equipment according to claim 17, wherein the indication of cell size comprises one of small, medium and large.

19. The user equipment according to claim 9, wherein N is a configurable parameter.

20. The user equipment according to claim 9, wherein the cell information for the last N cells visited includes an order of the cells visited.

21. The user equipment according to claim 9, further comprising:

connection evaluation logic operable to note a characteristic of the last radio resource control (RRC) connection obtained by the user equipment;

wherein the connection evaluation logic is operable to provide an indication of the characteristic to the network control node.

22. The user equipment according to claim 9, wherein the cell information comprises an overall assessed operational parameter indicative of a relationship between said user equipment and all of said last N cells visited.

23. The network control node according to claim 14, further comprising:

interpreting logic operable to interpret the ambient operational characteristics of the user equipment to generate a mobility profile for the user equipment.

24. A non-transitory computer-readable medium storing program instructions that, when executed on a computer, cause a computer-controlled user equipment to perform a method according to claim 1.

* * * * *